United States Patent [19]
Becker

[11] 3,991,531
[45] Nov. 16, 1976

[54] COMPOSITE WALL ELEMENT FOR THERMAL AND ACOUSTIC INSULATION

[76] Inventor: Otto Alfred Becker, Robert-Koch-Strasse 59, 66 Saarbruecken 6, Germany

[22] Filed: Mar. 22, 1974

[21] Appl. No.: 453,781

Related U.S. Application Data

[62] Division of Ser. No. 156,852, June 25, 1971, Pat. No. 3,808,784.

[30] Foreign Application Priority Data

| June 25, 1970 | Germany | 2031394 |
| July 21, 1970 | Germany | 2036013 |
| Sept. 2, 1970 | Germany | 2043461 |
| Sept. 18, 1970 | Germany | 2044378 |

[52] U.S. Cl. ............... 52/173 R; 52/172; 52/303; 52/615; 138/31; 200/81.9 R
[51] Int. Cl.² .......................................... E04C 2/00
[58] Field of Search ............ 52/171, 172, 407, 303, 52/304, 576, 577, 1, 615, 618; 138/31, 30; 236/92; 137/99, 99.5; 417/40, 41; 200/81.9

[56] References Cited
UNITED STATES PATENTS

| 710,889 | 10/1902 | Prescott | 138/31 |
| 1,436,987 | 11/1922 | Kempter | 138/31 |
| 1,458,209 | 6/1923 | Kempter | 138/31 |
| 1,708,464 | 4/1929 | Bodman | 52/576 |
| 1,931,791 | 10/1933 | Dueringer | 200/81.9 |
| 2,062,747 | 12/1936 | Gelstharp | 52/172 |
| 2,083,622 | 6/1937 | Summers | 52/1 |
| 2,441,571 | 5/1948 | Heineman | 52/304 |
| 2,877,516 | 3/1959 | Bobel | 52/616 |
| 3,161,265 | 12/1964 | Matsch | 52/303 |
| 3,264,165 | 8/1966 | Stickel | 52/406 |
| 3,364,639 | 1/1968 | Davenport | 52/407 |
| 3,604,163 | 9/1971 | McCardy | 52/172 |
| 3,629,980 | 12/1971 | Hordis | 52/1 |

FOREIGN PATENTS OR APPLICATIONS

| 107,186 | 4/1974 | Austria | 52/405 |
| 892,068 | 3/1944 | France | 52/172 |
| 1,108,188 | 1/1956 | France | 52/171 |
| 628,968 | 4/1936 | Germany | 52/1 |
| 102,843 | 9/1963 | Norway | 52/172 |

*Primary Examiner*—Price C. Faw, Jr.
*Assistant Examiner*—Henry Raduazo
*Attorney, Agent, or Firm*—Erich M. H. Radde

[57] ABSTRACT

The composite wall element of this invention comprises an insulating wall element arranged within or inserted into an outer, pressure resistant, preferably load bearing wall element which completely encloses the former. Within the inner insulating wall element and/or the cavity within the outer wall element a substantially dry gas atmosphere and preferably air atmosphere is established and maintained under subatmospheric, atmospheric, or superatmospheric pressure. Such novel composite wall elements are superior in their thermal and/or acoustic insulation properties to heretofore known structural elements.

2 Claims, 9 Drawing Figures

COMPOSITE WALL ELEMENT FOR THERMAL AND ACOUSTIC INSULATION

This is a division of application Ser. No. 156,852, filed June 25, 1971, now U.S. Pat. No. 3,803,784.

BACKGROUND OF THE INVENTION

1. Field of the Invention

The present invention relates to a novel and advantageous development of composite wall elements for walls, ceilings, and floors of every type, for every purpose, and of any suitable material, and in particular also to composite wall elements useful, for instance, for refrigerator houses and refrigerator chambers of means of transportation or the like.

2. Description of the Prior Art

A known wall unit of this kind comprises two sheet metal panels of equal size, sealing strips of resilient material arranged between the margins of said panels, and insulating plates filling the cavity between said panels. When used as components of an external wall, the individual wall units are suspended on wall supports by means of angle brackets. Similar wall units serve as partition walls extending from floor to ceiling for internal rooms. The thermal and acoustic insulation of such wall units is, however, poor.

SUMMARY OF THE INVENTION

It is, therefore, an object of the present invention to provide novel composite structural elements which are superior in their thermal and acoustic insulation properties to heretofore known insulating structural elements.

Other objects and advantageous features of the present invention will become apparent as the description proceeds.

To enable a person skilled in this art to clearly and completely understand the present invention, the entire structural element according to the present invention together with the insulating element provided therein will be referred to hereinafter and in the claims annexed hereto as "composite wall element", while the actual insulating element will be referred to as "smaller insulating wall element" or "inner wall element" and the outer wall of the composite wall element will be referred to as the "outer wall element".

In principle the composite wall element according to the present invention comprises a. an inner wall element or smaller insulating wall element, said inner wall element being arranged within b. an outer, pressure resistant, preferably load supporting, larger wall element enclosing the inner wall element. Thereby c. a substantially dry gas and preferably air atmosphere under subatmospheric, atmospheric, or superatmospheric pressure is established and maintained in the inner insulating wall element, for instance, by evacuating the inner wall element or by filling it with a dry gas, preferably dry air.

The smaller insulating wall element consists of a flexible or rigid envelope which seals off the element in air-tight, and preferably vapor-tight, fashion. It is composed, for instance, of plastic material. Within said envelope there are arranged insulating elements, preferably reflective sheets or foils, for instance, aluminum foils or plastic foils which have aluminum vapor-deposited thereon. Between said reflective sheets or foils there are provided preferably pressure-resistant spacers, for instance, reflecting honeycombs of hardened or cured cardboard or plastic.

In place of reflective honeycombs of plastic material having, for instance, a vapor-deposited layer of aluminum, there can also be used flat and/or corrugated plastic boards with reflective coatings, preferably combined in groups.

In place of flexible or rigid envelopes, there can be provided plates or sheets spaced apart from each other and consisting, for instance, of reflectively coated plastic material which are preferably connected with each other at least in air-tight manner on all sides, forming a box-like hollow space.

Around this smaller insulating inner wall element there is cast a pressure resistant outer wall element in such a manner that the inner wall element is surrounded preferably on all sides at least in an air-tight manner. The outer wall element may be composed, for instance, of several individual parts and providing more in particular an inner hollow space which serves to receive the inner insulating wall element.

Thus it is possible to impart to the resultant composite wall element extremely high insulating properties and at the same time any desired load supporting and compressive strength. Both the construction of the inner wall element and that of the outer wall element permit, of course, variations and combinations depending on and corresponding to the individual purposes. Thus, for instance, the outer wall element may only partially surround the inner wall element. The parts of the inner wall element which are not surrounded and lie free can be closed off in air- or vapor-tight fashion, for instance, by means of cover plates of any suitable material. This has the advantage that different types of building materials, depending on the purposes in view, can be combined to form a composite element according to the present invention. That part which is provided or cast around the edge portions of the inner wall element can serve as load-bearing frame. All individual elements, for instance, can be cast in place when casting the inner wall element, or they can be connected in an immediately subsequent operation with the casting material before it has solidified. In this way there is obtained an integral composite element which encloses the inner wall element on all sides.

The inner wall element, and likewise the hollow space of the outer wall element, can be connected by pipes which extend therein and have controllable valves thereon, to gas or, preferably, air drying devices, volume equalization elements, gas or preferably air filter devices, and pressure and suction pumps. In this way it is possible to provide the inside of the wall element with dry gas or preferably air and to maintain this condition therein. In this way precipitation or deposition of water of condensation on the reflective foils is prevented upon a decrease in the temperature. The reflective power of the sheets would be almost entirely eliminated by such precipitation or deposition. For the same reason, it is necessary to seal the inner wall element in as vapor-tight a manner as possible. In order to make the envelopes or covering layers, for instance, the plastic boxes surrounding the inner wall element vapor-tight, a multi-layer construction of the envelope or covering layer or of the box material is provided in accordance with the present invention. If they consist, for instance, of plastic sheets or foils or of plastic panels, they can be bonded, welded, pressed, or otherwise connected flat with each other in multi-layers. Thereby the surfaces to be connected with each other can be metallically coated or can contain metal foils, for instance, aluminum foils, between the surfaces to be connected. Furthermore, the foils or sheets themselves can be made of plastics in which metal powder is admixed.

Finally, the envelopes or covers or the boxes, after completion of the insulating element, can be immersed, for instance, in liquid plastic material to which preferably powdered metal has been added. Metal foils can also be bonded in vapor-tight manner, for instance, overlapped, around the inner wall element. If the inner wall element is then, for instance, cast into an outer wall element, any access of air is prevented. Nevertheless, since, aside from metals and glass, practically all other building materials are pervious to the water vapor of the air in accordance with the water-vapor pressure gradient which is present at the time, the vapor can penetrate into the inner wall element if the envelope or cover of said inner wall element is not sufficiently vapor-tight. It is, therefore, advantageous to provide vapor barriers and the like also in the outer wall element, particularly on its front wall. In particular, the entire hollow space in the outer wall element can be lined in vapor-tight manner.

In order to increase the load-bearing capacity of the connection of the wall surfaces of the outer wall element which extend parallel to each other, connecting anchoring means or armatures passing in an air- and vaportight manner through the inner wall element, can also be cast in place.

For the casting in place of the composite wall element, different construction or, respectively, casting materials for the front and rear sides to be cast and the edge parts of the outer wall element can be used and combined with each other in liquid or pasty state.

The outer wall element can, for instance, be cast in advance on all sides with the exception of the surface directed towards the inner space, a corresponding recess or cavity into which the inner wall element is inserted being provided to receive said inner wall element. The inner wall element can be arranged within or inserted into said recess or cavity in a air- and vapor-tight manner thus occupying the entire distance or space formed by the recess or cavity of the outer wall element. The casting material can be suitably selected and can be formed, for instance, of several materials combined. In particular, it can form an additional vapor-tight covering of the inner wall element. Furthermore, the insulating properties can be increased, for instance, by producing a foamed insulating element, for instance, by foaming to a rigid plastic foam. In the case of such prefabricated outer wall shells, the inner surfaces of the recess or cavity can be shaped, for instance, corrugated. They can be coated in vaportight manner with reflective foils and thus form additional radiation spaces, for instance, of about 10 mm. depth, opposite the inner wall element. Or the inner wall element with its flexible coverings can be caused to snugly or closely contact or engage the corrugations of the inner wall of the hollow space or cavity by means of the superatmospheric pressure of the dry air introduced by a pressure pump via pipelines and pipe lengths, thereby forming corresponding radiation spaces towards the inside of the inner wall element. For this purpose the inner sides of the flexible plastic envelopes or covers are coated, for instance, by vapor deposition with aluminum or they are covered with aluminum foils. In the case of such a close contact of the envelopes or coverings of the inner wall element against the hollow space or cavity of an outer wall shell in which it is inserted, the casting operation can be dispensed with at least towards the profiled or corrugated side of the outer wall element. The free surface of the inner wall element facing inside of the room of the building can nevertheless be cast or produced by foaming after suitably sealing the edges of the inner wall element. In its place there can be placed a covering board, for instance, a plaster board, which may also have a profiled or corrugated, reflecting, vapor-tight surface towards the inner element.

According to the present invention the hollow space or cavity of the outer composite wall element can also be provided or filled with a dry gas, preferably with dry air, said hollow space or cavity being lined, for instance, on all sides with aluminum in a vapor-tight manner and being sealed in a vapor-tight manner after insertion of the inner insulating element that preferably is also covered in a vapor-tight manner. Radiation chambers, for instance, horizontal radiation chambers preferably of a depth of about 10 mm. can be formed by providing spacing strips or bars. Insertion of the inner insulating element into the hollow space or cavity of the outer wall element filled with dry gas or air permits to arrange said inner insulating element in a completely pressureless, for instance, suspended or upright fashion so that heat conduction via the individual parts of the insulting elements contacting each other is reduced.

Of course, the vapor-tight inner wall elements as described hereinafter, can be inserted and preferably be cast in place in corresponding smaller dimension or size, for instance, into hollow bricks.

If vapor-tight sealing is secured by the envelope or covering or by the box of the inner wall element and, in addition thereto, by the outer wall element and its cavity or hollow space for an unlimited period of time, it is sufficient to fill the inner wall element with dry gas or air before sealing it or to effect its sealing in a dry gas or air chamber. As a matter of precaution, a certain quantity of gas or air drying agent, for instance, of calcium chloride, can be inserted in a perforated wrapping in the inner wall element.

BRIEF DESCRIPTION OF THE DRAWINGS

Illustrative embodiments of the invention and its advantages will be described below by way of example in the accompanying schematic drawings in which.

DESCRIPTION OF THE PREFERRED EMBODIMENTS

Figure 1:
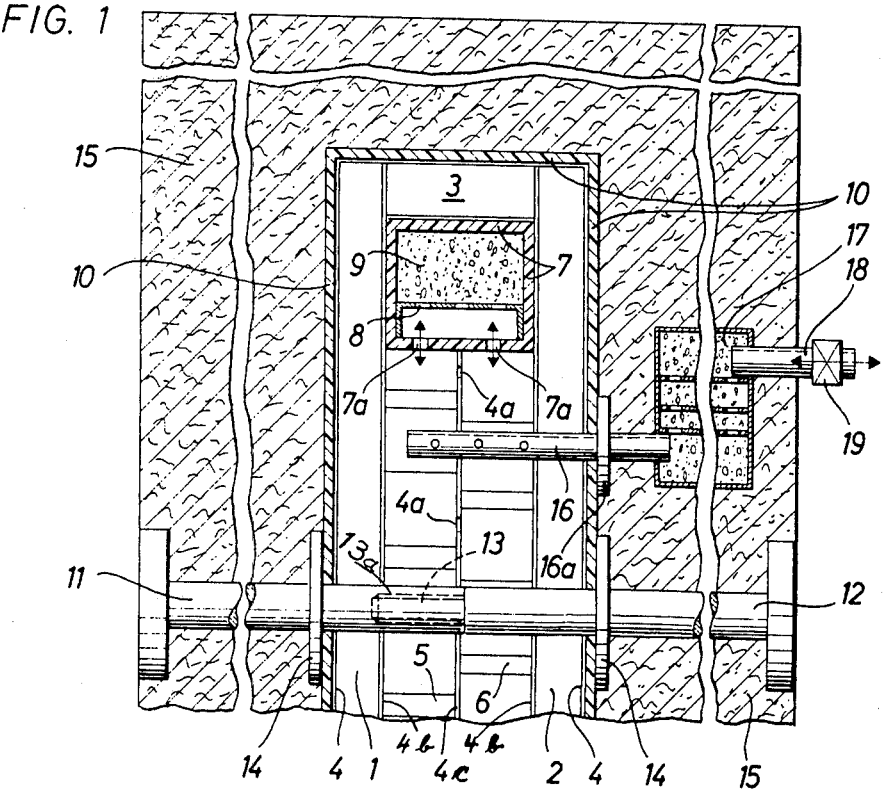
FIG. 1 is a cross-sectional view through a composite wall element consisting of an outer wall element and an inner wall element in place therein.

FIG. 1 shows in cross-sectional view the upper part of a composite wall element according to the present invention. This wall element consists of an inner wall element serving as thermally insulating element. It is enclosed on all sides by a covering 10 composed, for instance, of plastic material and is sealed in an at least air-tight and preferably also vapor-tight manner in said covering 10. An outer wall element 15 which, of course, is larger than the smaller inner wall element with its covering 10 is cast around the latter and serves to impart to the resulting composite wall element the required bearing or breaking as well as compressive strength.

The covering 10 is coated at its inner surface with a foil 4 of aluminum or of plastic material having aluminum vapor-deposited on both of its faces in order to ensure vapor-tight sealing. Plates, sheets, or boards 1, 2, and 3 made, for instance, of hardened plastic foam, cardboard, wood, plastic material or the like are inserted all around into the covering 10 so as to impart the desired shape and rigidity to all the inner faces of said covering 10. The inner faces of said plates 1, 2, and 3 are also reflecting towards the inner cavity or chamber of the wall element formed by them due to the reflecting foils 4b provided thereon.

The inner hollow space of the inner smaller wall element is subdivided by the provision of another reflecting foil 4c in the middle of said space. Said foil 4c has perforations 4a which permit exchange and passage of dry air therethrough, if necessary. On both sides of this intermediate reflective foil 4c there are inserted honeycomb-like, preferably pressure resistant supporting and spacer means 5 and 6, for instance, of hardened cardboard or plastic material. Thus radiation and gas or air chambers with their dry gas or air content being at rest are formed. The walls of these honeycomb structures are arranged vertically upon the reflective foils 4b and 4c. They may also be perforated so as to permit replacement and/or renewal of the drying gas or air.

If the thickness of the honeycomb plates 4a is between 5 mm. and 10 mm., gas or air convection due to variations in the temperature cannot take place in the chambers. The honeycomb structures can also be reflective. In place of honeycomb-like structures, there can also be interposed between the separating foil 4c and the reflective foils 4b perforated or otherwise punched out hardened foam plates or the like which serve as chamber-forming supporting and spacer means 5 and 6. If covering 10 is constructed as a pressure resistant box, for instance, of plastic material, it is usually sufficient to stretch or otherwise arrange the reflecting foils or reflecting plates at a distance of about 10 mm. from each other.

A tube or pipe 7, preferably a square tube or pipe or plastic material with perforations 7a at its lower part is provided in the upper part of the inner wall element. U-shaped sieve 8 upon which a hygroscopic agent 9, for instance, calcium chloride is placed, is inserted into said tube 7 as a precautionary measure so as to ensure with certainty dryness of the gas or air enclosed in the hollow space or chambers of the inner wall element.

By the term "dry gas" or "dry air" as used in the specification and in the claims annexed hereto, there is understood a gas or air which has been dried to such an extent that the degree of saturation with relative humidity will never be attained.

The outer supporting wall element 15 cast or otherwise firmly placed around the inner, smaller, insulating wall element comprising structures 1, 2, and 3 and covering 10 can consist of the most suitable structural material adapted to the desired purpose, for instance, of concrete. By casting the outer wall element around the inner wall element and thus completely enclosing the latter, air- and vapor-tight sealing of the inner wall element is additionally secured. Suitable additives can be admixed to the structural material forming the outer wall element for further improving the air- and vapor-tight seal of the inner wall element. As a result of providing such a multiple enclosure and sealing of the inner wall element the dry gas or air present therein remains in the dry state for an unlimited period of time.

It may, however, be desired to connect the inner wall element with an air drying device. For this purpose pipes 16 which are fitted in vapor-tight manner, extend from the outer wall element into the inner wall element and extend, for instance, via replaceable air drying devices 17 through pipes 18 provided with valves 19 out of the outer wall element 15. In this way it is possible subsequently to renew the air in the hollow space of the inner wall element if required.

Furthermore, all inner wall elements can be connected via pipe connections and manifolds with an air pump and circulation of dry air can be effected from time to time. For this purpose it is advisable to provide, for instance, the honeycomb-like and other supporting and spacer means with holes for the circulation of air.

FIG. 1, furthermore, shows two-part connecting and securing anchoring means 11 and 12 which can be joined by screwing said parts 11 and 12 together. These anchoring means are provided with pressure transmitting disks 14. Said disks 14 transmit the pressure from one of the walls 15 to the other wall 15 which is parallel opposed thereto and thus serve for increasing the compression or crushing strength of the composite wall element.

Preferably those places of the inner insulating wall element 10 through which the anchoring means 11 and 12 pass, are provided with corresponding borings or bore holes before inserting the anchoring means. The anchoring means parts 11 and 12 are inserted from both sides through said holes and are fit into one another. Part 12 is provided with screw thread 13 and part 11 with its corresponding internal thread 13a and both parts 11 and 12 are screwed together. The outer wall element is cast around the inner wall element. Disks 14 are arranged so that they vapor-tightly seal the holes in covering or box 10 and, as stated above, serve for pressure transmission by suitable attachment to anchoring means 11 and 12.

Improved pressure resistance is also achieved in a similar manner when using cover plates as described hereinafter in FIGS. 2 to 5 whereby corresponding recesses are provided in said cover plates.

FIGS. 2 to 5 show in cross-sectional view various embodiments of wall elements according to this invention.

Figure 2:
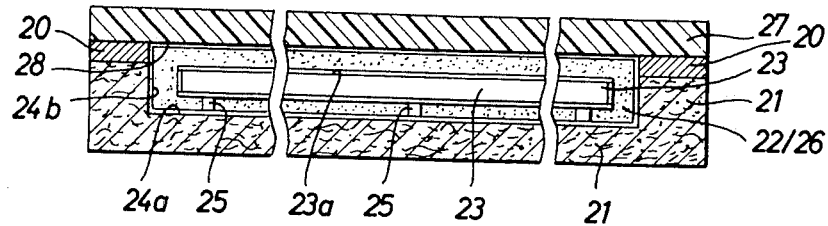
FIG. 2 is a cross-sectional view through a composite wall element consisting of an outer prefabricated wall shell with a hollow space and a plate or board covering said hollow space, as well as an inner wall element arranged therein.

FIG. 2 shows a preferred outer wall shell 21 with hollow space 22 which is vapor-tightly sealed on its inner sides, for instance, by aluminum foils 24a and multi-layer plastic foils 24b, thereby avoiding formation of heat bridges. Inner, air-filled or evacuated wall element 23 which is covered all around in vapor-tight manner is placed on spacer ledges 25 into said shell 21. Space 22 is then filled by pouring or foaming with a suitable building material 26. In this way vapor-tight sealing of the inner wall element is assured, the insulating effect with respect to temperature changes and sound transmission is improved, and the loadbearing and compressive strength of the outer wall element 21 is increased. Changes in pressure in the inner wall element caused by variations in temperature, are without effect on the outer wall element.

The outer wall element also includes cover wall 27 directed towards the inside, for instance, a plaster board or concrete slab. Towards the inner wall element it bears a vapor-tight coating 28, as a result of which the hollow space 22 is sealed in a vapor-tight manner all around.

To reduce heat conduction between wall shell 21 and cover wall 27, an insulating strip or band 20 consisting, for instance, of foamed plastic, such as rigid cellular polymers, glass fibers, rubber, or the like, or combinations of such insulating materials, is peripherally interposed in an air- and vapor-tight manner.

Figure 3:
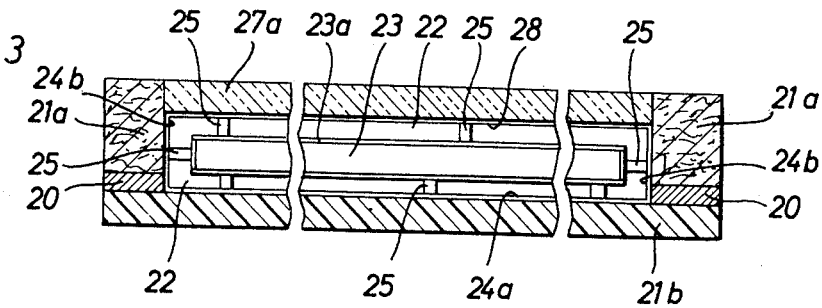
FIG. 3 is a cross-sectional view through a composite wall element consisting of a peripheral supporting frame with a front plate or facade board and a cover plate or board provided parallel to the front plate, as well as an inner wall element within the hollow space thus formed.

FIG. 3 shows a variant of the insulating wall element of FIG. 2. In this case the wall shell 21 of FIG. 2 is made of two parts and consists of a peripheral bearing and supporting frame 21a and a front or facade plate 21b which closes this frame off towards the outside. The cover plate or board 27a arranged towards the inside of the building is inserted into the peripheral frame 21a.

Preferably the vapor-tightly sealed hollow space 22 is filled with dry air, for instance, by introducing therein hygroscopic agents such as calcium chloride. The inner insulating element 23 is arranged either suspended or fixed between spacing ledges, strips, or bars 25 in a pressureless manner. The inner walls of the hollow space 22 as well as the covering 23a of the inner insulating element 23 are coated with reflective layers and the space between the horizontally extending spacing ledges, strips, or bars 25, said space having a depth of about 10 mm., is subdivided into numerous shallow radiation chambers. The ledges, strips, or bars 25 can be omitted and the hollow space 22 can be filled, for instance, with plastic foam plates which are preferably coated on both sides with metal foils and which form an air- and vapor-tight box-like structure after insertion of the insulating element 23 and 23a. To reduce heat conduction between front or face plate 21b and supporting frame 21a a peripherally arranged insulating strip or band 20, as in FIG. 2, is air- and vapor-tightly interposed.

If chamber-forming honeycombs are provided as spacing means in the insulating element 23 (see for instance, FIG. 1, parts 5 and 6), their heat conductivity can be considerably reduced by cutting jagged notches or recesses into the webs or bridges of the honeycombs so that there is only pointwise contact between the chambers. Due to the pressureless embedding of the insulating element 23, 23a into the cavity 22 the contact of all the parts of the wall element which causes heat conduction is reduced to a minimum. Another means of reducing heat conduction consists in applying a slight positive pressure of the dry air in the insulating element 23 which advantageously prevents contact of the parts of the wall element.

Figure 4:
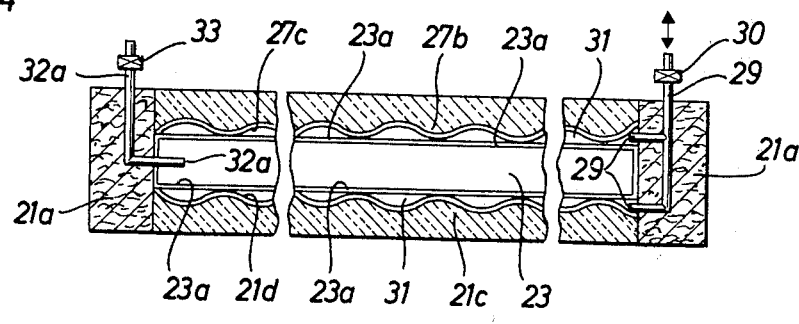
FIG. 4 is a cross-sectional view through a composite wall element with a peripheral supporting frame and inserted cover plates or boards on both sides, the inner side of said boards being corrugated, and an inner wall element being provided between said boards.

FIG. 4 shows another embodiment of the present invention providing a peripheral supporting frame 21a and therewithin cover boards 21c and 27b inserted from both sides. These two cover boards are corrugated on their inner sides and are provided with reflective, vapor-tight coverings 27c and 21d, respectively. In this way radiation spaces 31 are formed radiating towards the inner wall element 23 which also carries a reflective, vapor-tight covering on its outer surfaces 23a. These radiation spaces serve further to increase the effectiveness of the heat-cold insulation. These radiation spaces 31 can be provided with dry air as well as with compressed air or vacuum via pipe lengths 29 which extend on both sides of the element 23 into the radiation spaces 31 and which bear valves 30. Pipelines 32a with valves 33 can be inserted into the inner wall element 23 for ventilating with dry air.

Figure 5:
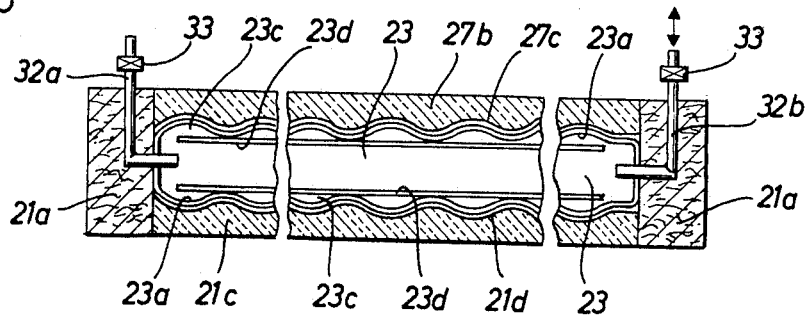
FIG. 5 is a cross-sectional view of the same composite wall element as in FIG. 4, but with a flexible inner wall element.

FIG. 5 shows a variant of FIG. 4. The flexible outer coverings 23a of the wall element 23 can be pressed by air pressure via pipe lengths 32a and 32b against the corrugated inner surfaces 27c and 21d of the two cover boards 21c and 27b. Thus by adapting the flexible covering 23a which is reflective on its inner side, to the corrugated shape there are produced within the wall element corresponding radiation spaces 23c. Inner reflective foils 23d are provided in the interior of the inner insulating wall element 23 as indicated in perspective view in FIG. 7 by reflective foils 54.

Figure 6:
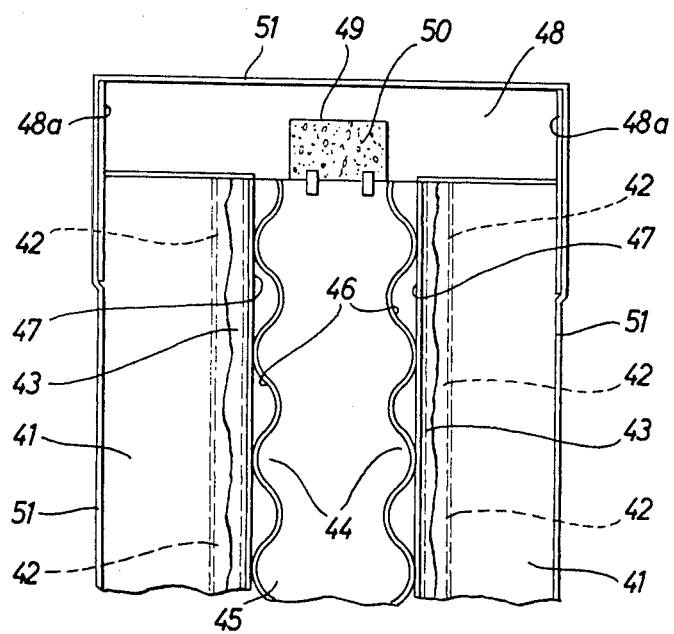
FIG. 6 is a cross-sectional view of part of an inner wall element the inner surfaces of which reflect and are undulated vertically in the drawing, and contained between them a reflecting element with undulations which are horizontal in the drawing.

FIG. 6 shows in cross-sectional view an airtight, vapor-tight inner wall element consisting of two outer insulating boards 41, their inner walls being provided with vertically corrugated surfaces 42 which are covered with reflective foils 43, and of an interposed insulating board 45 provided with horizontally corrugated surfaces 44, which surfaces are also covered on both sides with reflective foils 46. Between the insulating boards 41 and 45 there are clamped vertical reflective foils 47 by which the radiation spaces are subdivided. The hollow space between the boards 41 is sealed hermetically on all sides by frame-like peripheral edge parts 48 and the joints are also closed in air-tight and vapor-tight fashion by the bonding thereon of sealing strips 48a, for instance, of aluminum foils. Hygroscopic agents 50 can be provided as a matter of precaution on screens in recesses 49 in said edge strip 48 after dry air has been introduced into the radiation spaces. In the same way as the inside of the profiled surfaces are lined with vapor-tight and preferably metallic reflective foils, the surface or outer face of the wall element can also be covered on all sides with vaportight foils, for instance, with metal foils 51, which effect hermetical and vapor-tight sealing.

The boards 41 and frame 48 can consist of any suitable material, for instance, rigid plastic foam, corrugated cardboard, plastic material, plaster, glass, and the like. Hardened corrugated cardboard can be provided with a reflective coating, for instance, on all of its parts, i.e. on both sides of the corrugations and on both sides of the flat intermediate surfaces and the outer surfaces.

Figure 7:
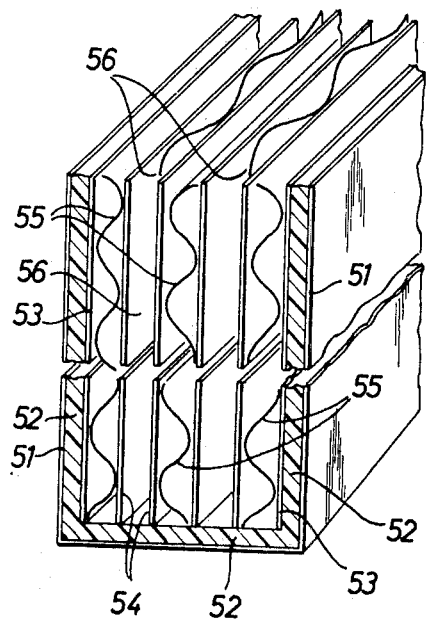
FIG. 7 shows in perspective cross-sectional and longitudinal sectional view another inner wall element consisting of a box-like outer body and inner insulating elements.

FIG. 7 shows in perspective view and in transverse and longitudinal section another type of inner wall element consisting of a box-like outer body 52 with vaportight outer covering 51 and inner reflective covering 53; of reflective foils, reflective boards; panels, and the like parts 54 arranged perpendicular thereto at a distance of about 10 mm., as well as of alternately intersecting horizontally and vertically interposed corrugated reflective foils or panels 55 and 56 consisting, for instance, of plastic material with aluminum applied thereto by vapor-deposition.

Said corrugated reflective foils or panels 55 and 56 are preferably of such consistency and strength that the inner wall element is resistant to compression, independently of the strength of the box 52 or of a covering. To achieve such consistency and strength, the reflective foils and/or panels or boards 53, 54, 55, and 56 can be connected in any suitable manner with each other, for instance, by glueing, stapling, or welding, so as to form a single unit, similar to a multi-layer corrugated cardboard. The advantage of this arrangement of high-gloss reflective elements on both sides is to concentrate an extremely high heat-cold insulating capacity onto a very small crosssection. There are particularly suitable for this purpose plastic foils and plastic boards having aluminum vapordeposited thereon which, although highly reflective, does not result in any heat conduction, despite contact, because the thickness of the layer is only about twelve thousandths of a millimeter.

Such foils and/or flat or shaped highly reflective plastic boards or plates can also be arranged individually, for instance, in spacing gaps between two cover walls.

The flat reflective foils or plastic boards can be omitted and, for instance, merely vertically and horizontally intersecting corrugated reflecting means, preferably of plastic material can be arranged and grouped together.

Figure 8:
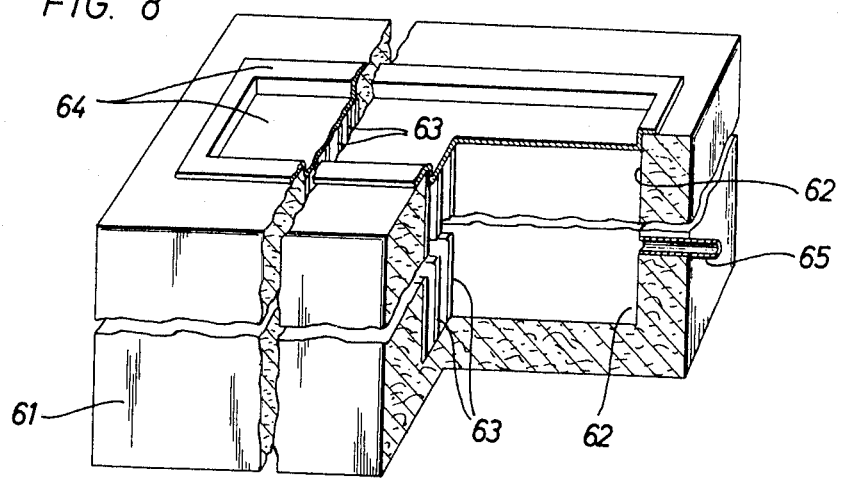
FIG. 8 shows in perspective a hollow block with its right corner cut away.

FIG. 8 shows in perspective view a single hollow block 61 open towards the top. The right front corner of this block is illustrated broken away in order to show the hollow space 62. Into this hollow space rectangular inner wall elements 63 can be inserted in the same manner as described in FIGS. 1 to 6. Said inner wall elements are constructed and composed as described hereinabove. They are only of reduced scale. The upper opening of the hollow block can be covered by cover plates or by a lid-like cover 64, for instance, of plastic. Said cover can be developed recessed in order to receive the building material bonding it to the next block.

Pipe lengths 65 for evacuating the hollow space 62 or for filling it with or exchanging dry gas or air can also be provided in the same manner as in the previously described wall elements.

Figure 9:
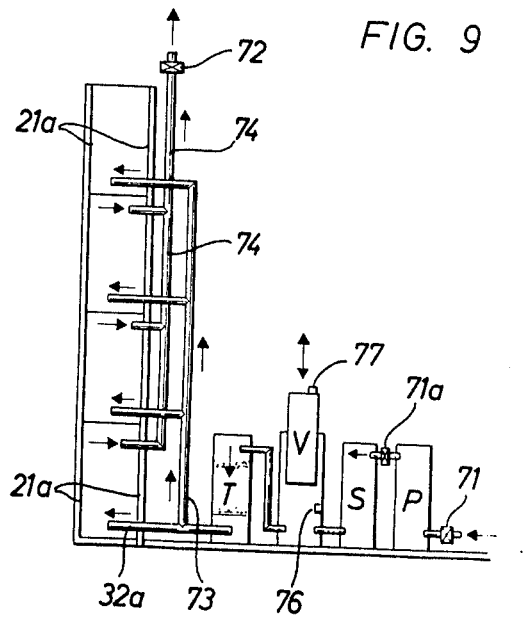
FIG. 9 is a schematic sectional view through composite wall elements of a building which are arranged in stories one above the other, with filter, drying, and volume equalization devices, and air pump.

FIG. 9 is a schematic section through composite wall elements 21a according to the present invention, said wall elements forming the walls of a multi-storied building. These wall elements are connected to an air pump P, an air filter device S, a volume equalization device V, an air drying device T, adjustable inlet valves 71 and 71a, and outlet valve 72. Into each wall element there extends a transverse pipe line 32a extending from a common feedline 73 which conducts the air into the lower part of each composite wall element after it has been drawn in by pump P, filtered and dried. In this way the lighter, moist air collected in the upper part of each wall element is forced via upper transverse pipe lines 32b into a air discharge pipe 74 and escapes towards the outside through the adjustable outlet valve 72. Depending on the adjustment of the valves, any desired pressure can be imparted to the dry air in the wall elements. Said pressure can be maintained by the provision of intermediate valve 71a.

If filter and drying devices with an adjustable inlet valve are arranged at the upper end of pipe 74, then the pump remaining at the bottom can draw fresh dry air into the wall elements and force the moist air outwards through an adjustable outlet valve.

Depending on the adjustment of the valves, any desired vacuum can be produced when proceeding in this manner.

If the upper inlet valve is omitted and if the atmospheric air thus has free access through the filter and the drying devices, then the pressure in the hollow space of the wall element is at all times the same as the atmospheric pressure. That the air in the wall element remains continuously dry is assured by providing the drying device. However, when the wall element is in open connection with the atmosphere, the volume equalization device is dispensed with.

On the other hand, if the valves close off the wall elements from the outside atmosphere, the volume equalization device can actuate a contact switch 76 as soon as the movable equilization part V descends in its casing as a result of a reduction in temperature. The actuated contact switch 76 then actuates the pump. In this way the danger of water of condensation forming upon a decrease in temperature or an increase in atmospheric pressure is eliminated. As soon as the required pressure conditions within the wall element have been reestablished, the pump motor, by lifting the movable equalization part V, actuates contact switch 77 which then again stops the motor.

The devices according to the present invention are suitable for achieving acoustic or acoustic and thermal insulation, depending on the selection and combination of the materials used in the construction of the wall elements and their arrangement therein.

All the features and embodiments of the apparatus and method described in the foregoing specification and illustrated in the drawings attached thereto and their combinations are essential for carrying out this invention.

The terms "casting the outer wall element around the inner insulating wall element" or "casting the inner insulating wall element into the outer wall element" or the like describe operations whereby, for instance, the outer wall element is prefabricated by casting, for instance, of concrete, inserting the inner insulating wall element into the hollow space left within said outer wall element, and sealing the hollow space with the inserted inner insulating wall element by pouring the concrete-yielding mixture thereover. It is also possible to insert the inner insulating wall element into a concrete form so that it is suspended therein and is surrounded on all its sides by a free space. The Portland cement-sand or -gravel paste is then poured into the free space of the concrete form. In both procedures there is produced a composite wall element as a combination of pressure-resistant, outer wall element enclosing the inner insulating wall element.

However, as it is evident from FIGS. 2 to 5 and 8, it is not an essential feature of the present invention that the inner insulating wall element is completely enclosed by casting the outer wall element around the same. FIGS. 2 to 5 provide covering plates to seal the hollow space with the inner wall element while in FIG. 8 the inner wall element can be inserted into the hollow space without the outer wall element being cast around the same. Furthermore, as is illustrated in FIGS. 3 and 4 an air or gas space can be provided between the inner insulating wall element and the outer pressure-resistant wall element.

It may be pointed out that the distance between two reflecting surfaces in the composite wall element according to the present invention should preferably not exceed about 12 mm. because at a greater distance air or gas convection within said space will take place. It is, however, necessary that the air or gas layer between reflecting foils or plates is substantially at rest, i.e. that it does not move although the temperature on one side of the wall element increases. The most favorable distance at which the air or gas remains stagnant or non-flowing, in spite of a considerable heat or temperature gradient, is a distance of about 5 mm. to about 10 mm.

I claim:
1. Wall structure for thermal and acoustic insulation of walls, ceilings and floors of buildings and other structures, comprising
   a. a plurality of adjacently disposed individual composite wall elements which form said wall structure, each of said composite wall elements including an outer wall element which is pressure resistant and an inner insulating wall element mounted within said outer wall element,
   b. first pipe means communicating with each composite element and with a first common feed line for admitting air simultaneously to each composite element,
   c. second pipe means communicating with each composite element and with a common discharge line for simultaneously discharging the air from each composite element,
   d. air pumping means for delivering ambient air to said common feed line,
   e. an air filter communicating with said air pumping means,
   f. an air drying device in communication with said air pumping means for drying the air and thus providing a dry gas atmosphere in said composite wall elements,
   g. adjustable valve means in said common feed line and said common discharge line for maintaining the desired air pressure in the composite wall elements and the replacement of the air therein, and
   h. a volume equalization device which comprises a casing with inlet and outlet pipes communicating with said air filter and an equalization part movably mounted in said casing depending on the changes in temperature and atmospheric pressure, a first contact switch provided in said casing for actuating said air pumping means on contact with the moving equalization part, and a second contact switch provided to stop said air pumping means on contact with said equalization part when the latter is moving in the opposite direction.

2. The wall structure of claim 1 wherein said air filter and said air drying device are disposed in communication with said common feed line and the outlet of said air pumping means for filtering and drying the ambient air delivered to said common feed line.

* * * * *